(12) United States Patent
Pike

(10) Patent No.: US 6,286,565 B1
(45) Date of Patent: Sep. 11, 2001

(54) CENTRAL TIRE INFLATION SYSTEM AND METHOD

(76) Inventor: Zebulen Pike, 15053 SE. 54th Pl., Bellevue, WA (US) 98006

( * ) Notice: Subject to any disclaimer, the term of this patent is extended or adjusted under 35 U.S.C. 154(b) by 0 days.

(21) Appl. No.: 09/648,106

(22) Filed: Aug. 25, 2000

(51) Int. Cl.$^7$ .................................................. B65B 31/00
(52) U.S. Cl. ................................ 141/38; 141/39; 141/83; 141/94; 141/95
(58) Field of Search ................................ 141/38, 39, 83, 141/94, 95; 152/415–417; 137/223, 224, 231

(56) References Cited

U.S. PATENT DOCUMENTS

| | | | |
|---|---|---|---|
| 4,387,931 | * 6/1983 | Bland ........................................ | 303/1 |
| 4,957,792 | * 9/1990 | Shizuo et al. ........................ | 428/36.2 |
| 5,158,122 | * 10/1992 | Moffett .................................... | 141/38 |
| 5,377,736 | * 1/1995 | Stech ..................................... | 152/417 |
| 6,105,645 | * 8/2000 | Ingram .................................. | 152/415 |

\* cited by examiner

*Primary Examiner*—Timothy L. Maust
(74) *Attorney, Agent, or Firm*—Dorsey & Whitney LLP

(57) ABSTRACT

A vehicle Central Tire Inflation Systems (CTIS). Specifically, the invention includes, but is not limited to, a quick-release fitting in fluid communication with the CTIS and attached to an air supply hose which terminates in another threadable or quick-release fitting for attachment to the wheel inflation stem. The device allows pressurized air to be supplied to the tires from the CTIS, but quickly disconnected from a tire in the event of a tire casualty or need to change wheel rims.

28 Claims, 2 Drawing Sheets

CENTRAL TIRE INFLATION SYSTEM AND METHOD

TECHNICAL FIELD

This invention relates in general to vehicle tire inflation, and in particular, to a vehicle Central Tire Inflation System (CTIS). Specifically, the invention relates to an improved CTIS for High Mobility Multipurpose Wheeled Vehicles (HUMMVEEs), a military, multi-purpose vehicle, and other vehicles using a CTIS.

BACKGROUND OF THE INVENTION

Various vehicles have developed a system for automatically inflating vehicle tires while in transit. Typically referred to as a Central Tire Inflation System (CTIS), the CTIS allows the vehicle driver to inflate or deflate the vehicle's tires to a higher or lower pressure respectively to accommodate a variety of vehicle loads, and road and traffic conditions. Control of the vehicle tire air pressure is provided by an air pressure controller that can be automatically adjusted or manually controlled in the cab by the vehicle's driver. The system provides an air compressor that is connected through the air pressure controller to the vehicle's front and rear tires. Rotary seal connections are provided at each wheel to permit flow of air from the air supply to the tires while the vehicle is in motion and the wheels are rotating.

There are, however, several drawbacks to some existing CTISs. For example, in the HUMMVEE, the tires cannot be inflated directly at the rim, but only through the existing CTIS via the "tank Valve" at the hub. Additionally, the CTIS cannot be disabled. Also, only "standard," or military issue rims or wheels can be used to ensure operability with the CITS.

SUMMARY OF THE INVENTION

The present invention is directed to an improvement in the HUMMVEE CTIS. Specifically, the invention provides a quick-disconnect feature for disconnecting one tire from the CTIS, and thereby preventing the opposite tire from deflating. The claimed invention includes, but is not limited to, a quick-release fitting in fluid communication with the CTIS and attached to an air supply hose which terminates in another threadable or quick-release fitting for attachment to the wheel inflation stem. The device allows pressurized air to be supplied to the tires from the CTIS, but quickly disconnected from a tire in the event of a tire casualty or need to change wheel rims. The claimed invention also permits use of a variety of "civilian", or after-market rims or wheels to be used in lieu of standard, military issue rims on HUMMVEES equipped with the CTIS. Moreover, the invention allows users to selectively disconnect tires from the CTIS without compromising the integrity of the CTIS.

DETAILED DESCRIPTION OF THE INVENTION

The present invention is directed to an apparatus and method for releasably connecting a Central Tire Inflation System (CTIS) to the pneumatic tires of a motor vehicle. Specific details of several embodiments of the invention are set forth in the following description, and in FIGS. 2–5, to provide a thorough understanding of such embodiments. A person of ordinary skill in the art will understand, however, that the present invention may have additional embodiments, and that the invention may be practiced without several of the details described in the following description.

Figure 1:
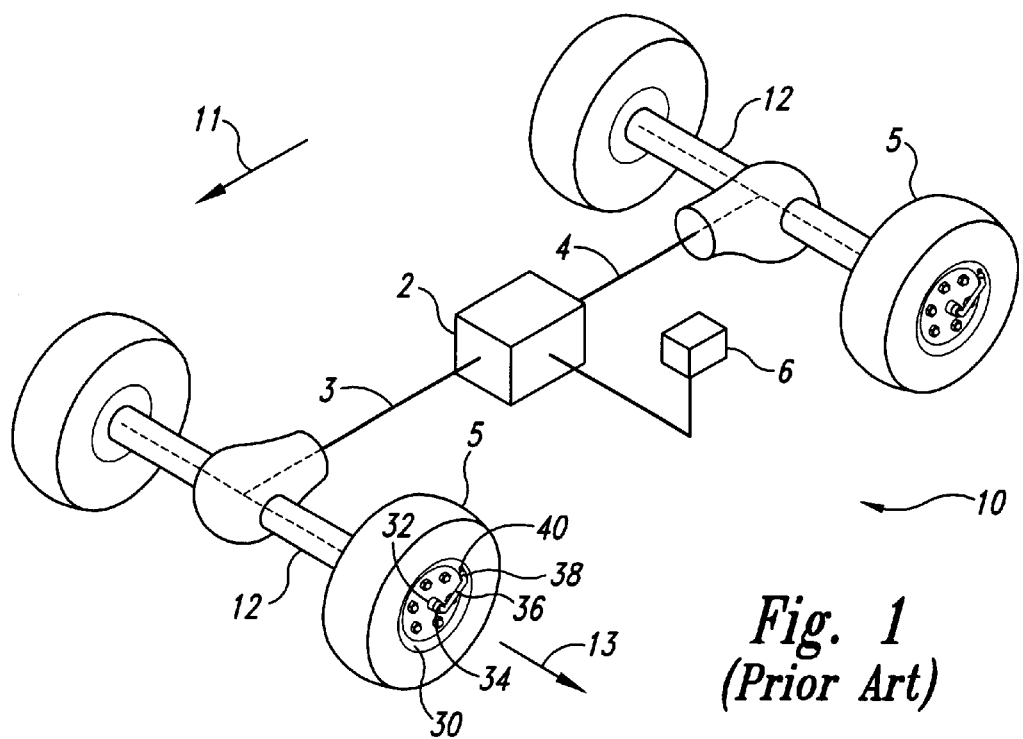
FIG. 1 is an isometric view of a vehicle equipped with a typical CTIS.

FIG. 1 shows a typical vehicle Central Tire Inflation System (CTIS) 10, according to the prior art with the front of the vehicle in direction 11. The system 10 comprises an electric air compressor 2 or an air compressor driven mechanically by the engine, and sending pressurized air to an air reservoir (not shown). From the air reservoir, the air is sent through tubes or pipes, such as 3 and 4, to the tires 5. The tubes 3, 4 communicate with the tires 5 through fluid couplings and tubes extending through the center of the drive shafts 12. A control valve 6, commonly located in the vehicle's cab, is used to selectively control the air pressure of the associated tires 5 of the vehicle.

Still referring to FIG. 1, the CTIS 10 further includes a rotary seal assembly 32 at the center of each rim or wheel 30. This rotary seal assembly 32 provides for an airtight rotating joint in order to assure a connection between the air supply 2 and each of the tires 5 through the hub of each wheel 30. A fitting 34 is threadably connected to the seal assembly 32. The fitting 34, while being airtight, is free to rotate about the wheel axis 13 and the seal assembly 32. A supply line hose 36 is affixed is to the opposite end of the fitting 34, and then threadably connected at 38 to a wheel inflation stem 40.

Typically, the wheel inflation valve stem 40 for a CTIS HUMMVEE is not a conventional valve stem made of rubber with a Schrader valve therein, but is a solid, metal valve stem that is "thru-bolted" into the wheel 30. This wheel inflation stem 40 generally does not contain a Schrader valve. As a result, a catastrophic tire failure causes the opposite tire to deflate also.

Figure 2:
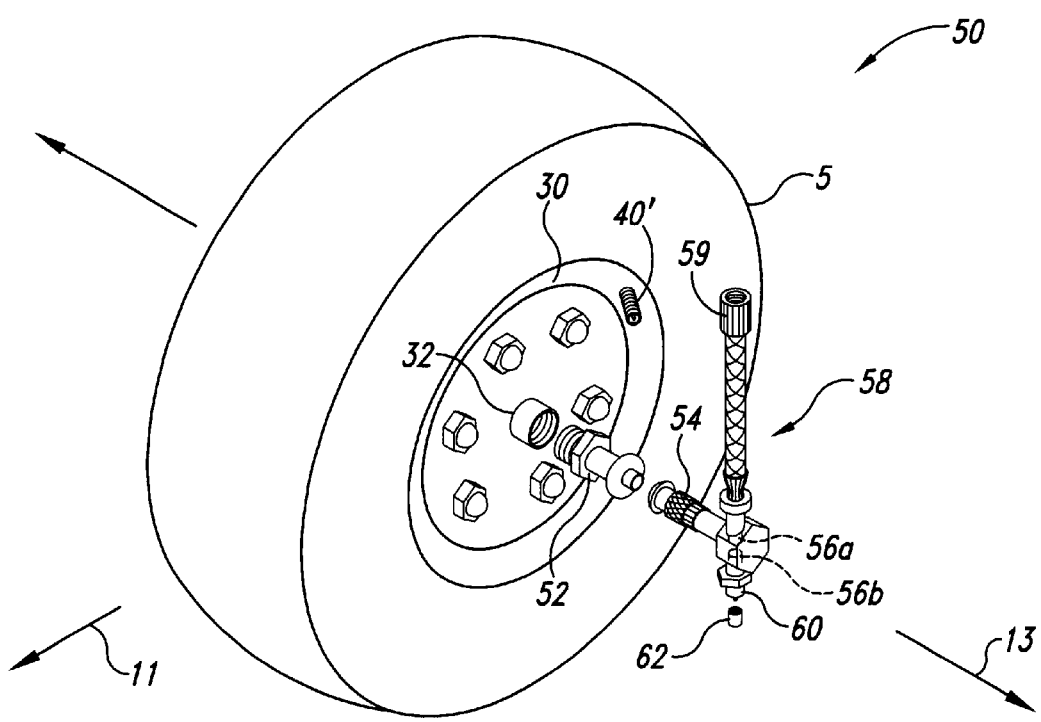
FIG. 2 is an isometric view showing one embodiment of a CTIS according to the invention.

Turning now to FIG. 2, one embodiment of a CTIS system 50 in accordance with the proposed invention is depicted. As shown, a quick disconnect male fitting 52 is threadably attached to the rotary seal assembly 32. The rotary seal assembly 32 receives compressed air from a supply tube that extends through the axle, as described in the foregoing discussion of the prior art CTIS system 10. A female quick disconnect fitting 54 can then be coupled to the corresponding male fitting 52. At the distal end of the female fitting 54 are two threaded recesses 56a and 56b. Threadably affixed to recess 56a is a supply line assembly 58. A valve stem assembly or "tank valve" 60 is threadably attached into the recess 56b. The orientation of the supply line assembly 58 and the tank valve 60 are interchangeable into the recesses 56a and 56b. A fitting 59 at the end of the supply line assembly 58 is threaded onto the inflation system 40' when the CTIS 50 is in use. However, unlike the prior art inflation system 40 shown in FIG. 1, the inflation system 40' is of conventional design containing a Schrader valve. The tank valve 60 contains a Schrader valve (not shown) within. Finally, a dust cap 62 can be threadably affixed to the open end of the tank valve 60 to protect the Schrader valve within the tank valve 60 from the environment. The tank valve 60 permits inflation of the tire by air sources other than the CTIS.

The fittings 52 and 54 may be comprised of any durable material suitable for the purpose, and could be made of brass or stainless steel for example. Moreover, the use of the mated quick disconnect fittings 52 and 54 allow for more freedom of rotation of the supply line assembly 58 of CTIS system 50 during wheel 30 rotation.

Figure 3:
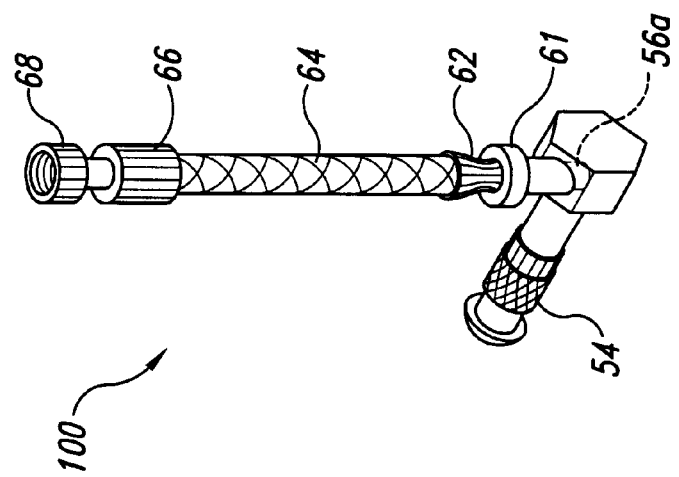
FIG. 3 is an isometric view of one embodiment of an air supply line that may be used in the system of FIG. 2.

Referring to FIG. 3, another embodiment of the supply line assembly 100 includes a threaded male fitting 61 for screwing into the recess 56*a*. An air supply line 64 is fluidly connected to the fitting 61. A crimped or swaged member 62 provides a fluid tight connection between the supply line 64 and the fitting 61. The air supply line 64 can be made of rubber or any other suitable material, that is capable of sustaining internal air pressures commonly associated with tire inflation. Alternatively, the supply line 64 may be made of wire-bound flexible hose or a reinforced plastic hose material, or even rigid metal tubing. A female threaded fitting 68 is fluidly connected to the opposing end of air supply line 64. A crimped or swaged member 66 provides a fluid tight connection between the supply line 64 and the fitting 68. With reference now to FIGS. 2 and 3, the female threaded fitting 68 contains a one-way check valve (not shown). compressed air from the a tire 5 of system 50 in the event that another tire is unable to maintain inflation due to a leak, puncture, or a blowout. If the system 40 optionally includes a Schrader valve, the one-way check valve may additionally include a plunger (not shown) that is structured to depress the Schrader valve in the wheel inflation system 40 so that the Schrader valve is maintained in an open state when the one-way valve and the system 40 are connected stem 40, thereby permitting the tire 5 to be inflated by the CTIS. On the other hand, if the tire 5 were to go flat, the one-way check valve prevents loss of air from the CTIS 10 through the compromised tire 5. This is especially true if there is no Schrader valve in the wheel inflation stem 40. If however, there is a Schrader valve in the inflation system 40, the supply line assembly 58 can be removed to isolate the tire 5 from the remainder of the CTIS 50 in the event of a leak in the CTIS 50, which might be caused, for example, by a leak in another tire 5. In such a case, the supply line assembly 58 need not contain a one-way valve.

As mentioned above, the fitting 68 is threadably attached to the wheel inflation system 40. As a result of this configuration, the tire 5 may be inflated by the CTIS 50 and/or through the tank valve 60. As also mentioned above, by disconnecting the quick release fitting 54 from the rotary seal assembly 52 or the fitting 68 from the wheel inflation stem 40, the tire 5 can be isolated from the CTIS 50. This prevents the opposite tire from going flat, for example, during changing of a flat tire.

Figure 4:
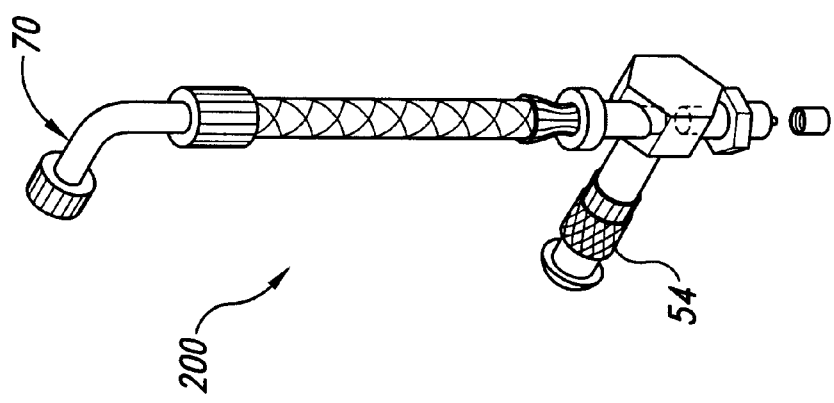
FIG. 4 is an isometric of an alternative embodiment of an air supply assembly that may be used in the CTIS of FIG. 2.

Another embodiment of the supply line assembly 200 of CTIS system 50 is illustrated in FIG.4. Here, the supply line assembly 200 terminates in an elbow shapeded, threadable, female fitting 70 for attachment to the wheel inflation stem 40. This arrangement accommodates a greater range of variations in wheel inflation stems 40, particularly those parallel to the axis of tire rotation 13, i.e., normal to the wheel 30, such as found on the standard HUMMVEE CTIS compatible wheel 30, as best shown in FIG. 2.

Figure 5:
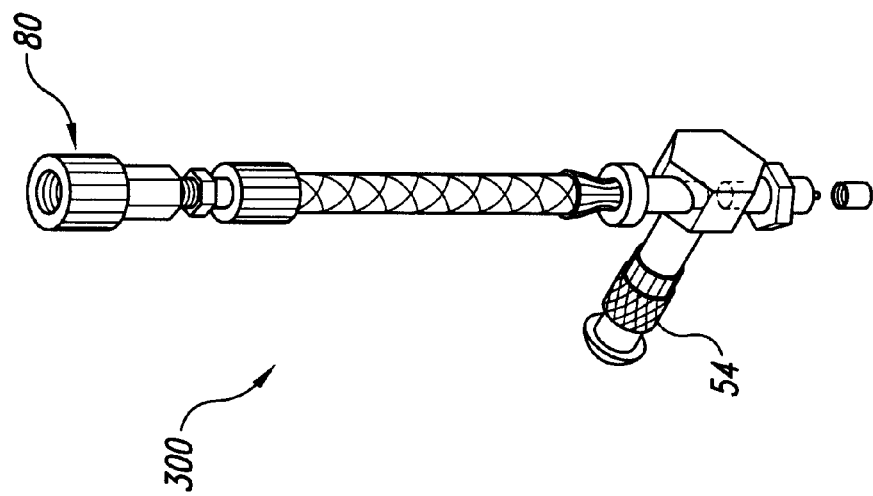
FIG. 5 is an isometric view of another alternative embodiment of an air supply assembly that may be used in the CTIS of FIG. 2.

Lastly, as shown in FIG. 5, another embodiment of the supply line assembly 300 of CTIS system 50 terminates in a female quick disconnect fitting 80 for connecting to the valve stem assembly 40. The inner diameter (not shown) of the fitting 80 is such that it provides an airtight seal when connected to the wheel inflation stem 40. By using the quick-disconnect fittings 54 and 80 together, the tire 5 can be more rapidly isolated from the CTIS 50 and spare tire changes made even more quickly. This is particular configuration also has the advantage of making any wheel 30 or wheel inflation stem 40 compatible with the HUMMVEE CTIS 10 as shown in FIG. 1.

While various embodiments of the invention has been illustrated and described in detail herein, it will be apparent that changes and additions may be made therein and hereto without departing from the spirit of the invention, and which are encompassed within the spirit of the invention and the scope of the appended claims.

What is claimed is:

1. An apparatus for maintaining tire inflation in each tire of a vehicle having a plurality of tires, the vehicle having a Central Tire, Inflation System (CTIS) adapted to controllably maintain a predetermined inflation pressure in each tire, and an inflation system in fluid communication with each tire, comprising:

a first fitting fluidly attached to an airtight rotary seal assembly portion of a CTIS;

a second fitting fluidly and releasably attached to the first fitting;

an air supply hose fluidly attached to the second fitting;

a third fitting fluidly attached to the opposite end of the air supply hose, the third fitting being fluidly attached to the inflation system; and a one-way valve positioned between the first fitting and the inflation system, the one-way valve being operable to permit inflation air to be communicated to the tire when the second fitting is attached to the first fitting, and to maintain an inflation pressure within the tire when the second fitting is selectively detached from the first fitting.

2. The apparatus of claim 1, further comprising a tank valve fluidly attached to the second fitting.

3. The apparatus of claim 1, wherein the third fitting is elbow shaped.

4. The apparatus of claim 1, wherein the third fitting comprises a female quick-disconnect fitting capable of making an airtight seal with the inflation system.

5. The apparatus of claim 1, wherein the first fitting comprises a male quick-disconnect fitting and the second fitting comprises a female quick-disconnect fitting.

6. The apparatus of claim 1, wherein the one-way valve is positioned adjacent to the inflation system.

7. The apparatus of claim 1, wherein the one-way valve is positioned in one of the second and third fittings.

8. The apparatus of claim 1, wherein the first, second, and third fittings comprise respective quick-disconnect fittings.

9. The apparatus of claim 1, wherein the air supply hose comprises a flexible air supply hose.

10. The apparatus of claim 1, wherein the air supply hose comprises a rigid air supply hose.

11. An air inflation system for tires on a vehicle having a Central Tire Inflation System (CTIS) that permits the selective isolation of the tires from the CTIS, comprising:

a first coupling fluidly coupled to the CTIS;

a fluid conduit having a first end and a second end and structured to communicate inflation air, the first end being fluidly coupled to the first coupling;

a second coupling fluidly coupled to the second end of the fluid conduit and fluidly coupled to an inflation system in fluid communication with each tire, the second coupling being structured to communicate inflation air from the second end of the fluid conduit to the inflation system; and a one-way valve fluidly interposed between the first coupling and the inflation system, the one-way valve being operable to allow inflation air to be communicated to a tire when the first coupling fluidly communicates with the inflation system, and to fluidly isolate the tire from the CTIS and retain the inflation air within the tire when the fluid communication between the first fluid coupling and the inflation system is selectively interrupted.

12. The system according to claim 11 wherein the first coupling is further comprised of a manually releasable fluid coupling with a first portion fixedly attached to the CTIS and a second mating portion that is manually releasable from the first portion.

13. The system according to claim 12 wherein the first coupling is further comprised of third coupling having a first inlet location fluidly coupled to the second portion and structured to receive inflation air from the second portion, an outlet location fluidly coupled to the first end of the fluid conduit, and a second inlet location being fluidly connected to a tank valve adapted to fluidly connect with a source of inflation air independent of the CTIS.

14. The system according to claim 11 wherein the fluid conduit is further comprised of a flexible hose.

15. The system according to claim 14 wherein the first end of the fluid conduit is further comprised of a permanently affixed swaged fitting adapted to threadably connect to the first coupling.

16. The system according to claim 15 wherein the second end of the fluid conduit is further comprised of a permanently affixed swaged fitting adapted to threadably connect to the second coupling.

17. The system according to claim 11 wherein the second coupling is further comprised of a manually releasable fluid coupling with a first portion fixedly attached to the inflation system and a second mating portion that is manually releasable from the first portion.

18. The system according to claims 11 wherein the second coupling is further comprised of an angled elbow portion with a first end fluidly coupled to the second end of the fluid conduit and a second end removably attached to the inflation system.

19. The system according to claim 11 wherein the one-way valve is positioned approximately adjacent to the first fluid coupling.

20. The system according to claim 11 wherein the one-way valve is positioned approximately adjacent to the second fluid coupling.

21. The system according to claim 20 wherein the inflation system further comprises a Schrader valve, and the second fluid coupling comprises a plunger that is structured to open the Schrader valve when the second fluid coupling is fluidly connected to the inflation system.

22. An air inflation system for tires on a vehicle having a Central Tire Inflation System (CTIS) that allows the selective disconnection of the tires from the CTIS, comprising:

a first coupling fluidly connected to the CTIS, the first coupling including a male quick-disconnect fitting threadably joined to the CTIS at a wheel hub location, and a female quick-disconnect fitting with a first end and a second end, the first end being structured to receive the male quick-disconnect fitting;

a fluid manifold having an inlet location and an outlet location, the inlet location being fluidly attached to the second end of the female quick-disconnect fitting;

a flexible air conduit capable of communicating inflation air and having a first end and a second end, the first end being fluidly attached to the outlet location on the fluid manifold;

a second coupling having an inlet and an outlet, the inlet being fluidly attached to the second end of the flexible air conduit; and an air inflation system having an inlet and an outlet, the outlet being in fluid communication with the tire, and the inlet being fluidly connected to the outlet of the second coupling.

23. The system of claim 22 wherein the air inflation system is further comprised of a one-way valve.

24. The system of claim 22 wherein the fluid manifold is further comprised of a second inlet location that is fluidly attached to a tank valve assembly that is structured to selectively admit inflation air to the tire.

25. The system of claim 22 wherein the second coupling is further comprised of a male quick-disconnect fitting threadably joined to the air inflation system, and a female quick-disconnect fitting with a first end and a second end, the first end being structured to receive the male quick-disconnect fitting, and the second end is fluidly attached to the second end of the flexible air conduit.

26. The system of claim 22 wherein the air inflation system extends outwardly from the vehicle tire and is further comprised of a central axis that is approximately parallel to the rotational axis of the tire, and a second coupling that is further comprised of a rigid, angled connector that is structured to fluidly connect the second end of the flexible air conduit to the inlet location of the air inflation system, the rigid, angled connector having angle of approximately about 90 degrees.

27. In a Central Tire Inflation System (CTIS) having an air inflation line extending from the hub of a wheel to an inflation stem in fluid communication with the interior of a tire, the inflation stem including a one-way valve, a method of isolating a tire from the remainder of the system, comprising:

detecting an inflation air loss from the CTIS;

identifying the source of the inflation air loss; and disconnecting the air inflation line from the inflation stem of each tire not identified as the source of the inflation air loss.

28. The method of claim 27, further comprising disconnecting the air inflation line from the wheel hub to remove the air inflation line from each tire not identified as the source of the inflation air loss.

* * * * *